United States Patent
Deng et al.

(10) Patent No.: US 9,848,140 B2
(45) Date of Patent: Dec. 19, 2017

(54) HORIZONTAL BANDING REDUCTION WITH RAMP GENERATOR ISOLATION IN AN IMAGE SENSOR

(71) Applicant: OMNIVISION TECHNOLOGIES, INC., Santa Clara, CA (US)

(72) Inventors: Liping Deng, Cupertino, CA (US); Min Qu, Mountain View, CA (US); Bi Yuan, San Jose, CA (US); Yingkan Lin, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 30 days.

(21) Appl. No.: 15/087,253

(22) Filed: Mar. 31, 2016

(65) Prior Publication Data

US 2017/0289470 A1  Oct. 5, 2017

(51) Int. Cl.
| | |
|---|---|
| *H04N 5/357* | (2011.01) |
| *H04N 5/378* | (2011.01) |
| *H04N 5/376* | (2011.01) |
| *H04N 5/369* | (2011.01) |
| *H04N 5/3745* | (2011.01) |

(52) U.S. Cl.
CPC ............ *H04N 5/357* (2013.01); *H04N 5/378* (2013.01); *H04N 5/3765* (2013.01); *H04N 5/3698* (2013.01); *H04N 5/37455* (2013.01); *H04N 5/37457* (2013.01)

(58) Field of Classification Search
CPC ...... H04N 5/357; H04N 5/3765; H04N 5/378; H04N 5/3698; H04N 5/37455; H04N 5/37457
See application file for complete search history.

(56) References Cited

U.S. PATENT DOCUMENTS

| | | |
|---|---|---|
| 6,384,817 B1 | 5/2002 | Janssen et al. |
| 7,116,138 B2 | 10/2006 | Lim |
| 2016/0301891 A1* | 10/2016 | Kim .................... H04N 5/37455 |

OTHER PUBLICATIONS

OV16860—16MP product brief: "Industry's Fastest Frame Rate 16-Megapixel PureCel® Plus-S Sensor for Smartphones and Action Cameras", Version 1.1, Oct. 2015, OmniVision, retrieved from: www.ovt.com, 2 pages.

* cited by examiner

*Primary Examiner* — Twyler Haskins
*Assistant Examiner* — Fayez Bhuiyan
(74) *Attorney, Agent, or Firm* — Christensen O'Connor Johnson Kindness PLLC

(57) ABSTRACT

A readout circuit for use in an image sensor includes a system ramp generator coupled to generate a system ramp signal. A plurality of analog-to-digital converters is coupled to a plurality of column bitlines from a pixel array to receive corresponding analog column image signals. An isolation ramp buffer is coupled between the system ramp generator and the analog-to-digital converters. The isolation ramp buffer includes a single input to receive the system ramp signal, and a plurality of isolated outputs. Each of the isolated outputs is coupled to provide an isolated column ramp signal to a corresponding analog-to-digital converter. Each of the of analog-to-digital converters is coupled to generate a corresponding digital column image signal in response to the corresponding analog column image signal and corresponding isolated column ramp signal.

15 Claims, 3 Drawing Sheets

HORIZONTAL BANDING REDUCTION WITH RAMP GENERATOR ISOLATION IN AN IMAGE SENSOR

BACKGROUND INFORMATION

Field of the Disclosure

The present invention relates generally to image sensors. More specifically, examples of the present invention are related to circuits that readout image data from image sensor pixels.

Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of CMOS image sensors.

In a conventional CMOS active pixel sensor, image charge is transferred from a photosensitive device (e.g., a photo diode) and is converted to a voltage signal inside the pixel cell on a floating diffusion node. In conventional CMOS image sensors, an amplifier such as a source follower circuit is used in the pixel cells to amplify the signal on the floating diffusion node to output the image data to the bit lines, which are read by the column readout circuitry. The analog signals that are readout from the pixels by the readout circuitry are converted to digital signals in each of the columns.

A continuing challenge with image sensor readout circuits is presented with the charge kickback noise from the analog-to-digital converters included in the readout circuitry, which degrades the performance of the readout circuitry. The degraded performance of analog-to-digital converters that is caused by the charge kickback noise spreads to the analog-to-digital converters in other columns throughout in the readout circuitry. The kickback noise can disturb the input signal voltages of the analog-to-digital converters, and consequently manifest itself as unwanted horizontal banding, which is sometimes also referred to as horizontal smear or horizontal streak noise, in the resulting images that are acquired by the image sensor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
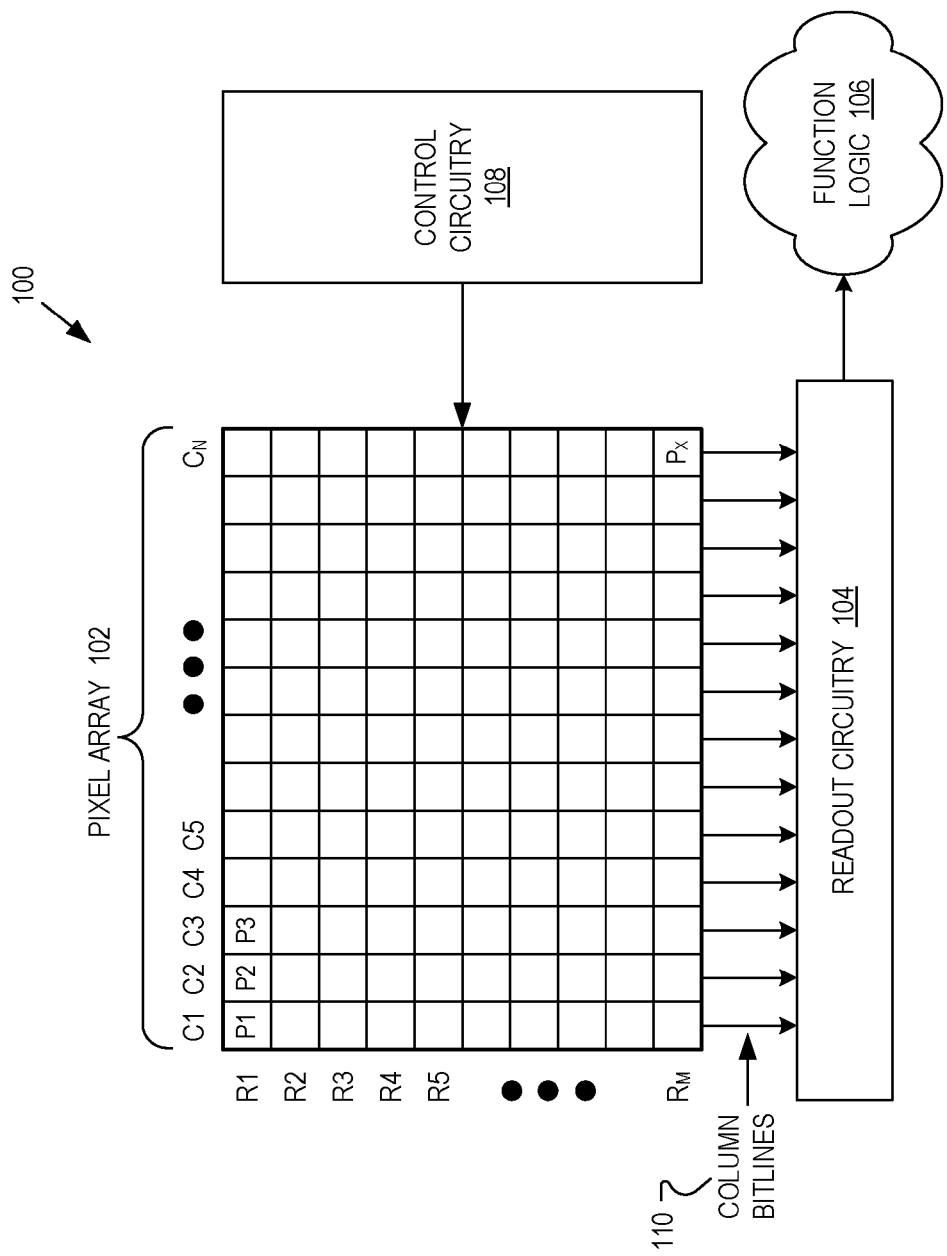
FIG. 1 is a is a block diagram illustrating an example imaging system including a image sensor pixel array that is coupled to readout circuitry featuring ramp generator isolation with reduced horizontal banding in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, examples in accordance with the teaching of the present invention describe a readout circuit for use in an image sensor that includes a system ramp generator coupled to generate a system ramp signal. The system ramp signal is received at the single input of an isolation ramp buffer. The isolation ramp buffer also includes a plurality of isolated outputs. Each isolated output of the isolation ramp buffer generates a separate isolated column ramp signal, which is received by a corresponding analog-to-digital converter. Each of the analog-to-digital converters is also coupled to the column bit line of the pixel array to receive a corresponding analog column image signal from the pixel array. Each analog-to-digital converter converts the received analog column image signal to a digital column image signal.

With the isolation ramp buffer generating the plurality of isolated column ramp signals at each of the plurality of isolated outputs, the system ramp generator output is separated or isolated from the inputs of the analog-to-digital converters, instead of the system ramp generator output being directly coupled to the inputs of the analog-to-digital converters. The isolation ramp buffer not only provides increased driving capability with each of the separate isolated column ramp signals that are generated, but also provides system ramp generator isolation, which reduces the unwanted effects of kickback as well as the unwanted interaction among the different columns of the pixel array the can cause unwanted horizontal banding, horizontal smear, or horizontal streak noise in the resulting images that are acquired by the image sensor in accordance with the teachings of the present invention.

To illustrate, FIG. 1 is a block diagram illustrating an example imaging system 100 including a readout circuitry that provides ramp generator isolation from the analog-to-digital converters, which therefore reduces unwanted horizontal banding, horizontal smear, or horizontal streak noise in the resulting images that are acquired by the imaging system in accordance with the teachings of the present invention. Specifically, FIG. 1 shows example image sensing system 100 having readout circuitry 104, which is will be discussed in greater detail below includes a system ramp generator with isolation, which reduces reduced horizontal banding in accordance with the teachings of the present invention. As shown in the depicted example, imaging system 100 also includes pixel array 102 coupled to control circuitry 108, and readout circuitry 104, which is coupled to function logic 106.

In one example, pixel array 102 is a two-dimensional (2D) array of imaging sensors or pixels (e.g., pixels P1, P2, P3, . . . , $P_X$). In one example, each pixel is a CMOS imaging pixel. As illustrated, the pixels in pixel array 102 are arranged into rows (e.g., rows R1 to $R_M$) and columns (e.g., columns C1 to $C_N$) to acquire image data of a person, place, object, etc., which can then be used to render a 2D image of that person, place, object, etc.

In one example, after each pixel has accumulated its image data or image charge, the image data is coupled to be received by readout circuitry 104 through column bitlines 110 and is then transferred to function logic 106. In various examples, readout circuitry 104 may also include additional amplification circuitry, sampling circuitry, ramp generator circuitry, analog-to-digital conversion circuitry, or otherwise. In various examples, readout circuitry 104 also includes an isolation ramp buffer that separates or isolates the ramp generator circuitry from the analog-to-digital conversion circuitry. The isolation ramp buffer provides increased driving capability, and reduces the unwanted effects of kickback noise, which can cause unwanted horizontal banding, horizontal smear, or horizontal streak noise in the resulting images that are acquired by the image sensor in accordance with the teachings of the present invention. Function logic 106 is coupled to the readout circuitry 104, and may simply store the image data readout by readout circuitry 104, or even manipulate the image data by applying post image effects (e.g., crop, rotate, remove red eye, adjust brightness, adjust contrast, or otherwise). In one example, readout circuitry 104 may readout a row of image data at a time along readout column bitlines 110 (illustrated) or may readout the image data using a variety of other techniques (not illustrated), such as a serial readout or a full parallel readout of all pixels simultaneously.

In one example, control circuitry 108 is coupled to pixel array 102 to control operational characteristics of pixel array 102. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
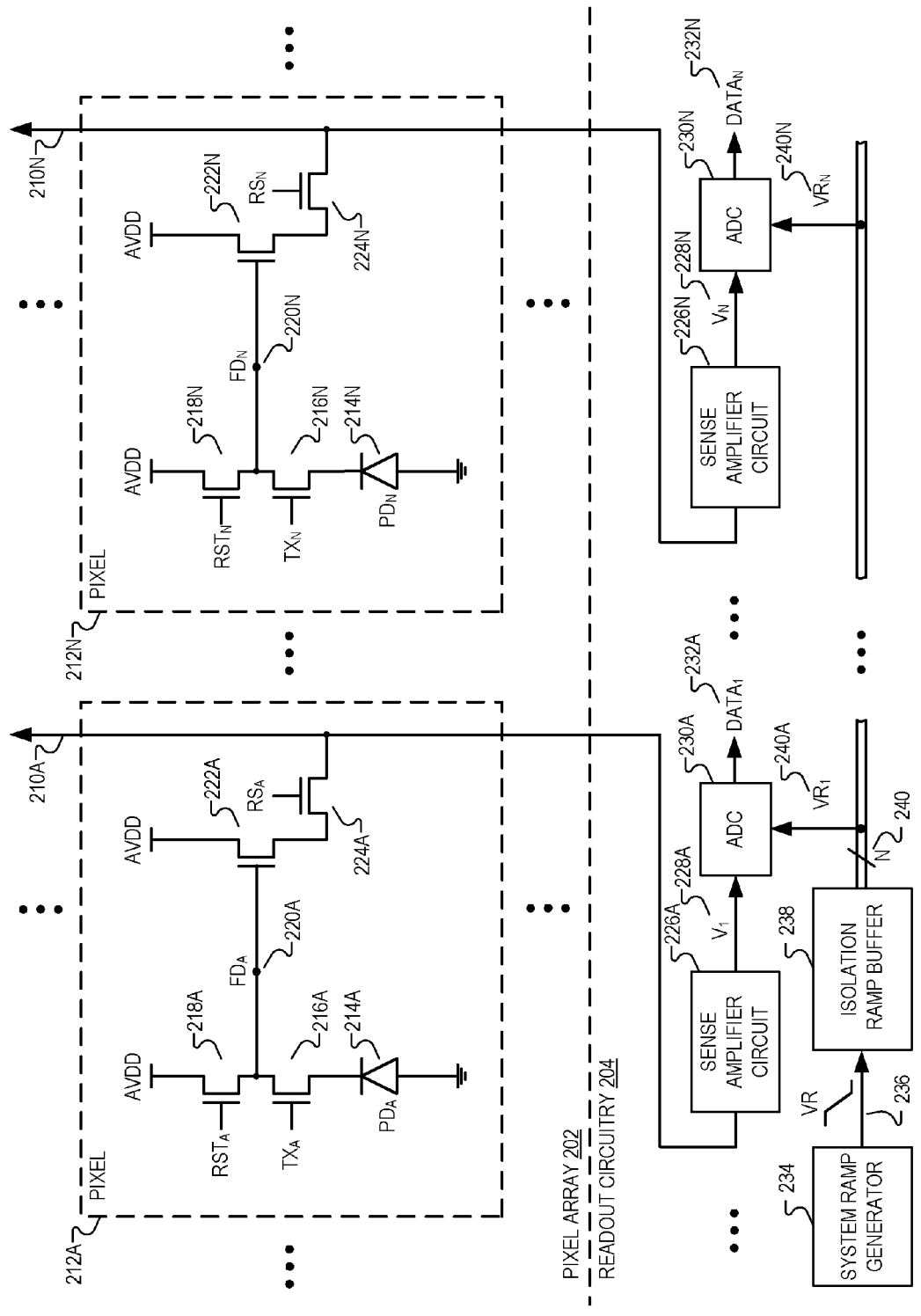
FIG. 2 is a schematic illustrating one example of pixels from multiple columns of an image sensor pixel array that are coupled to readout circuitry featuring ramp generator isolation with reduced horizontal banding in accordance with the teachings of the present invention.

FIG. 2 is a schematic illustrating one example of a pixel array 202 coupled to readout circuitry 204, which includes an isolation ramp buffer 238 coupled between a system ramp generator and the analog-to-digital converters of the readout circuitry to separate the ramp generator circuitry from the analog-to-digital conversion circuitry, and therefore reduce the unwanted effects of kickback noise that can cause unwanted horizontal banding, horizontal smear, or horizontal streak noise in the resulting images that are acquired in accordance with the teachings of the present invention. It is noted that the pixel array 202, and readout circuitry 204 of FIG. 2 may be examples pixel array 102, and readout circuitry 104 of FIG. 1, and that similarly named and numbered elements referenced below are therefore coupled and function similar to as described above.

In the example depicted in FIG. 2, multiple columns from a row of pixels of pixel array 202 are illustrated, including pixels 212A-212N. It is noted that pixels 212A-212N are illustrated as being a four-transistor (4T) pixels. It is appreciated that pixels 212A-212N are one possible example of pixel circuitry architecture for implementing each pixel within pixel array 202. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel architectures in accordance with the teachings of the present invention.

In the specific example illustrated in FIG. 2, pixel 212A includes a photosensitive element, which may also be referred to as a photodiode ($PD_A$) 214A to accumulate image charge, a transfer transistor 216A responsive to a transfer signal $TX_A$, a reset transistor 218A responsive to reset signal $RST_A$, a floating diffusion node ($FD_A$) 220A, an amplifier transistor, which is illustrated as a source-follower transistor 222A, and a row select transistor 224A responsive to row select signal $RS_A$ coupled to output column bitline 210A. Similarly, pixel 212N includes a photodiode ($PD_N$) 214N to accumulate image charge, a transfer transistor 216NA responsive to a transfer signal $TXN_A$, a reset transistor 218N responsive to reset signal $RST_N$, a floating diffusion node ($FD_N$) 220N, an amplifier transistor, which is illustrated as a source-follower transistor 222NA, and a row select transistor 224N responsive to row select signal $RS_N$ coupled to output column bitline 210N.

It is appreciated that operation of pixel 212A and pixel 212N are substantially similar. Therefore, operation of only pixel 212A is described in detail below, and it is appreciated that similar operation may be described for pixel 212N. With respect to pixel 212A during operation, transfer transistor 216A receives transfer signal $TX_A$, which selectively transfers the image charge accumulated in photodiode $PD_A$ 214 to floating diffusion node $FD_A$ 220A. In the illustrated example, reset transistor 218A is coupled between a power supply voltage (AVDD) and the floating diffusion node $FD_A$ 220A to reset levels in the pixel 212A (e.g., discharge or charge the floating diffusion node $FD_A$ 220A and the photosensitive element $PD_A$ 214A to a preset voltage) in response to a reset signal $RST_A$. The floating diffusion node $FD_A$ 220A is coupled to control the gate of amplifier transistor 222A. Furthermore, amplifier transistor 222A is coupled between a power supply voltage (AVDD) and row select transistor 224A. Amplifier transistor 222A operates as a source-follower amplifier providing a high impedance connection to the floating diffusion node $FD_A$ 220A. Row select transistor 224A selectively couples the image data output of pixel 212A to the output column bitline 210A in response to row select signal $RS_A$. In the illustrated example, output column bitline 210A is coupled to selectively readout the analog image signal from the column of the pixel array 202 to readout circuitry 204.

The example depicted in FIG. 2 also illustrates portions of readout circuitry 204 that are coupled to multiple respective columns of pixel array 202. In particular, the portion of readout circuitry 204 coupled to the column of pixel array 202 that includes pixel 212A includes a sense amplifier circuit 226A, which is coupled to output column bitline 210A to readout image data from pixel 212A of pixel array 202. In one example, the image data that is sensed with sense amplifier circuit 226A is output as voltage $V_1$ 228A, which is coupled to be received by an analog-to-digital converter (ADC) 230A. Similarly, the portion of readout circuitry 204 that is coupled to the column of pixel array 202 including pixel 212N includes a sense amplifier circuit 226N that is coupled to output column bitline 210N to readout image data from pixel 212N of pixel array 202. In one example, the image data that is sensed with sense amplifier circuit 226N is output as voltage $V_N$ 228N, which is coupled to be received by analog-to-digital converter (ADC) 230N. In one example, the sense amplifier circuit may be omitted, and each output column bitline 210 is connected to its respective ADC 230. In another example, an auxiliary circuit, such as a current bias circuit or clamping circuit may be connected between each output column bitline 210 and its respective ADC 230.

The example shown in FIG. 2 illustrates that readout circuitry 204 also includes a system ramp generator 234, which is coupled to generate a system ramp signal VR 236. An isolation ramp buffer 238 includes a single input, which is coupled to receive the system ramp signal VR 236. As shown in the example, the isolation ramp buffer 238 is coupled between, and therefore separates, the system ramp generator 234 and the plurality of analog-to-digital converters of readout circuitry 204, which include analog-to-digital converters 230A and 230N. Isolation ramp buffer 238 includes a plurality of N separate isolated outputs, which generate a plurality of N isolated column ramp signals 240 in response to the system ramp signal VR 236. Each one of the plurality of N isolated column ramp signals 240 is coupled to be received by a corresponding analog-to-digital converter 230 of readout circuitry 204. In one example, each one of the plurality of N isolated column ramp signals 240 is directly connected to be received by a corresponding analog-to-digital converter 230 of readout circuit 204.

For instance, one of the plurality of N isolated column ramp signals 240 is illustrated in FIG. 2 as isolated column ramp signal $VR_1$ 240A, which is coupled to be received by analog-to-digital converter 230A. Analog-to-digital converter 230A therefore converts the analog column image signal received from pixel 212A into digital column image signal $DATA_1$ 232A in response to isolated column ramp signal $VR_1$ 240A and voltage $V_1$ 228A.

Another one of the plurality of N isolated column ramp signals 240 is illustrated in FIG. 2 as isolated column ramp signal $VR_N$ 240N, which is coupled to be received by analog-to-digital converter 230N. Analog-to-digital converter 230N converts the analog column image signal received from pixel 212N into digital column image signal $DATA_N$ 232N in response to isolated column ramp signal $VR_N$ 240N and voltage $V_1$ 228N.

Figure 3:
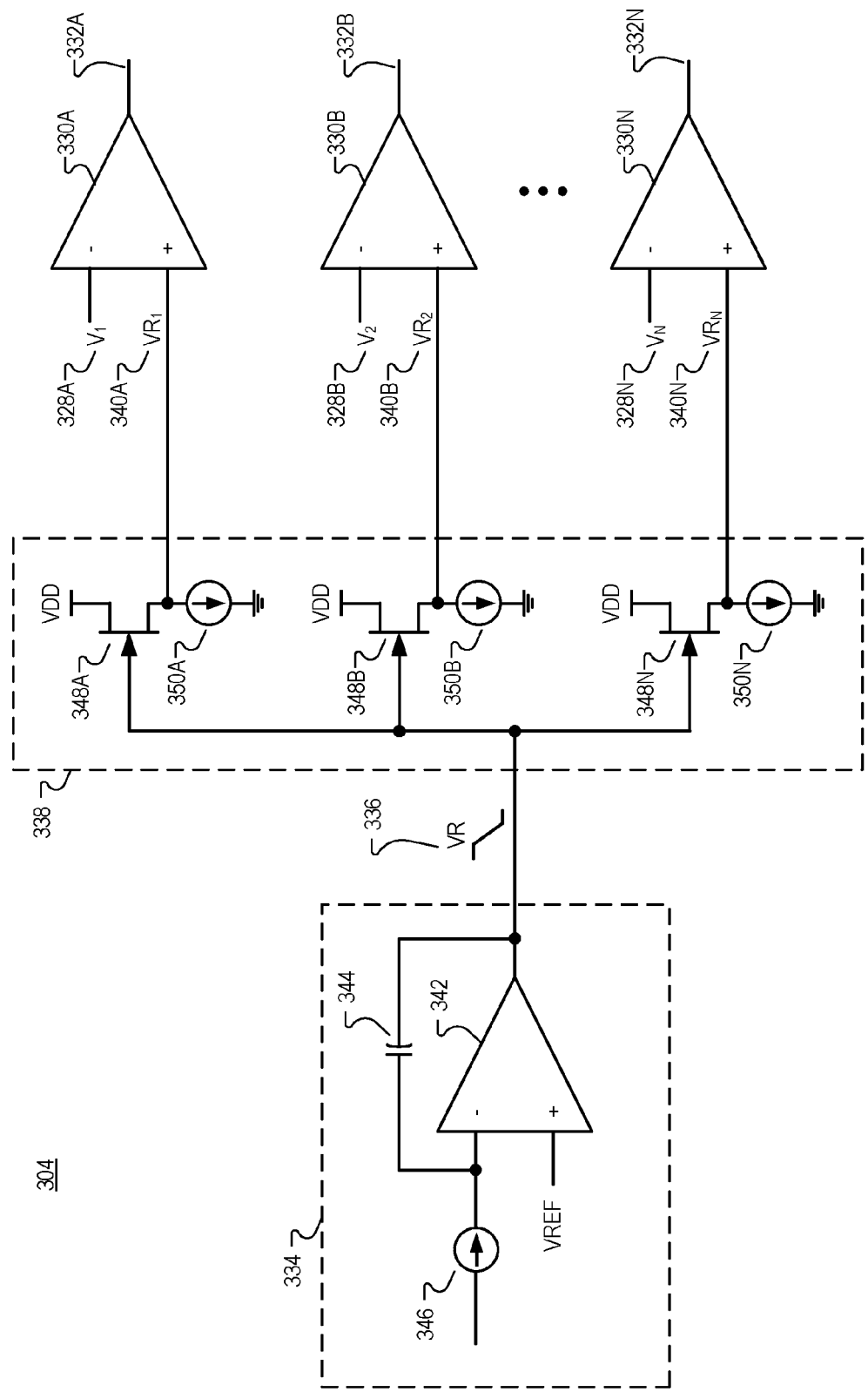
FIG. 3 is a schematic illustrating one example of a system ramp generator coupled to isolation ramp buffer circuitry included in the readout circuitry providing reduced horizontal banding in accordance with the teachings of the present invention in accordance with the teachings of the present invention.

FIG. 3 is a schematic illustrating one example readout circuitry 304 showing increased detail of one example of a system ramp generator coupled to an isolation ramp buffer circuitry providing ramp generator isolation to provide reduced horizontal banding in acquired images in accordance with the teachings of the present invention. It is noted that the readout circuitry 304 of FIG. 3 may be an example of the readout circuitry 204 of FIG. 2, or an example of readout circuitry 104 of FIG. 1, and that similarly named and numbered elements referenced below are therefore coupled and function similar to as described above.

For instance, in the example depicted in FIG. 3, readout circuitry 304 includes a system ramp generator 334 is coupled to generate a system ramp signal VR 336. Readout circuitry 304 also includes a plurality of analog-to-digital converters, which include a comparators 330A, 330B, ... 330N. In the example, each one of the comparators 330A, 330B, ... 330N of the plurality of analog-to-digital converters is coupled to receive a corresponding one of a plurality of analog column image signals, illustrated as voltages $V_1$ 328A, $V_2$ 328B, $V_N$ 328. In the depicted example, voltages $V_1$ 328A, $V_2$ 328B, ... $V_N$ 328 are coupled to be received at the inverting input terminals of comparators 330A, 330B, ... 330N, respectively. In addition, an isolation ramp buffer 338 is coupled between the system ramp generator 338 and the plurality of analog-to-digital converters including comparators 330A, 330B, ..., 330N. In one example, isolation ramp buffer 338 is connected between system ramp generator 338 and the plurality of analog-to-digital converters including comparators 330A, 330B, ..., 330N.

As shown in the depicted example, isolation ramp buffer 338 includes a single input coupled to receive the system ramp signal VR 336. Isolation ramp buffer 338 also includes a plurality of isolated outputs, each of which is coupled to provide a corresponding isolated column ramp signals, which are illustrated in FIG. 3 as isolated column ramp signals $VR_1$ 340A, $VR_2$ 340B, ... $VR_N$ 340N. Each one of the isolated column ramp signals $VR_1$ 340A, $VR_2$ 340B, ... $VR_N$ 340N is coupled to be received by a corresponding comparator 330A, 330B, ... 330N, respectively, of the plurality of analog-to-digital converters. In the depicted example, the isolated column ramp signals $VR_1$ 340A, $VR_2$ 340B, ... $VR_N$ 340N are directly coupled to be received at the non-inverting input terminals of comparators 330A, 330B, ... 330N, respectively. Each one of the plurality of comparators 330A, 330B, ... 330N is coupled to output a corresponding digital column image signal 332A, 332B, ... 332N in response to the corresponding analog column image signal $V_1, V_2, \ldots V_N$, and the corresponding isolated column ramp signal $VR_1$ 340A, $VR_2$ 340B, ... $VR_N$ 340N.

The example depicted in FIG. 3 illustrates that isolation ramp buffer 338 includes a plurality of transistors, which are shown as transistors 348A, 348B, ... 348N. Each one of the transistors 348A, 348B, ... 348N includes a gate terminal that is coupled to the single input of the isolation ramp buffer 338 to receive the system ramp signal VR 336. In the example, the gate terminals of transistors 348A, 348B, ... 348N provide high impedance connections to the output of system ramp generator 334. In addition, each one of the transistors 348A, 348B, ... 348N includes a source terminal that is coupled to a corresponding one of the plurality of isolated outputs of isolation ramp buffer 338 to provide the corresponding one of the plurality of buffered isolated column ramp signal VR$_1$ 340A, VR$_2$ 340B, . . . VR$_N$ 340N to the corresponding one of the plurality of comparators 330A, 330B, . . . 330N of the plurality of analog-to-digital converters. In one example, the isolation ramp buffer 338 further includes a plurality of current sources, which are shown as current sources 350A, 350B, . . . 350N. Each one of the plurality of current sources 350A, 350B, . . . 350N is coupled between the source terminal of a corresponding one of the plurality of transistors 348A, 348B, . . . 348N and ground. In the depicted example, the drain terminal of each one of the plurality of transistors 348A, 348B, . . . 348N is coupled to a power supply voltage (VDD) terminal as shown.

In the example depicted in FIG. 3, the system ramp generator 334 includes an operational amplifier 342 including a first input coupled to a reference voltage VREF. In the example, the first input of operational amplifier 342 is a non-inverting input of the operational amplifier 342. A current source is coupled to a second input of the operational amplifier as shown. In the example, the second input of operational amplifier 342 is an inverting input of the operational amplifier 342. The depicted example also illustrates that a capacitor 344 is coupled between the second input of the operational amplifier 342 and an output of the operational amplifier 342. As shown in the example, the output of the operational amplifier 342 is coupled to provide the system ramp signal VR 336 to the single input of the isolation ramp buffer 338.

Thus, it is appreciated that with isolation ramp buffer 338 receiving the system ramp signal VR 336 at the single input, and then generating the buffered plurality of isolated column ramp signals VR$_1$ 340A, VR$_2$ 340B, VR$_N$ 340N at each of the plurality of isolated outputs, the system ramp generator 334 output is therefore separated or isolated from the inputs of comparators 330A, 330B, . . . 330N, instead of being directly coupled to each of the comparators 330A, 330B, and 330N. The isolation ramp buffer 338 provides increased driving capability as well as increased isolation, which reduces the effects of kickback and other unwanted interactions among the different columns of the pixel array that can cause unwanted horizontal banding, horizontal smear, or horizontal streak noise in the resulting images that are acquired by the image sensor in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A readout circuit for use in an image sensor, comprising:
    a system ramp generator coupled to generate a system ramp signal;
    a plurality of analog-to-digital converters, wherein each one of the plurality of analog-to-digital converters is coupled to a corresponding one of a plurality of column bitlines from a pixel array to receive a corresponding one of a plurality of analog column image signals;
    an isolation ramp buffer coupled between the system ramp generator and the plurality of analog-to-digital converters, wherein the isolation ramp buffer includes a single input coupled to receive the system ramp signal, wherein the isolation ramp buffer further includes a plurality of isolated outputs, wherein each one of the plurality of isolated outputs is coupled to provide a corresponding one of a plurality of isolated column ramp signals to a corresponding one of the plurality of analog-to-digital converters, wherein each one of the plurality of analog-to-digital converters is coupled to generate a corresponding digital column image signal in response to the corresponding one of the plurality of analog column image signals and the corresponding one of the plurality of isolated column ramp signals; and
    a plurality of sense amplifier circuits, wherein each one of the plurality of sense amplifier circuits is coupled between the corresponding one of the plurality of column bitlines and the corresponding one of the plurality of analog-to-digital converters.

2. The readout circuit of claim 1, wherein the isolation ramp buffer comprises a plurality of transistors, wherein each one of the plurality of transistors includes a gate terminal coupled to the single input of the isolation ramp buffer to receive the system ramp signal, and wherein each one of the plurality of transistors includes a source terminal coupled to a corresponding one of the plurality of isolated outputs to provide the corresponding one of the plurality of isolated column ramp signals to the corresponding one of the plurality of analog-to-digital converters.

3. The readout circuit of claim 2, wherein the isolation ramp buffer further comprises a plurality of current sources, wherein each one of the plurality of current sources is coupled between the source terminal of a corresponding one of the plurality of transistors and ground.

4. The readout circuit of claim 1, wherein the system ramp generator comprises:
    an operational amplifier having a first input coupled to a reference voltage;
    a current source coupled to a second input of the operational amplifier; and
    a capacitor coupled between the second input of the operational amplifier and an output of the operational amplifier, wherein the output of the operational amplifier is coupled to provide the system ramp signal to the single input of the isolation ramp buffer.

5. The readout circuit of claim 4, wherein the first input of the operational amplifier is a non-inverting input of the operational amplifier, and wherein the second input of the operational amplifier is an inverting input of the operational amplifier.

6. The readout circuit of claim 1, wherein each one of the plurality of analog-to-digital converters comprises a comparator having a first input and a second input, wherein the first input is coupled to receive the corresponding one of the plurality of analog column image signals, and wherein the second input is coupled to receive the corresponding one of the plurality of isolated column ramp signals.

7. The readout circuit of claim 6, wherein the first input of the comparator is an inverting input of the comparator, and wherein the second input of the comparator is a non-inverting input of the comparator.

8. An imaging system, comprising:
a pixel array including a plurality of pixels organized into a plurality of rows and columns;
control circuitry coupled to the pixel array to control operation of the pixel array; and
a readout circuit coupled to the pixel array to readout the image data from the pixels, wherein the readout circuit includes:
a system ramp generator coupled to generate a system ramp signal;
a plurality of analog-to-digital converters, wherein each one of the plurality of analog-to-digital converters is coupled to a corresponding one of a plurality of column bitlines from a pixel array to receive a corresponding one of a plurality of analog column image signals to derive the image data from the pixels;
an isolation ramp buffer coupled between the system ramp generator and the plurality of analog-to-digital converters, wherein the isolation ramp buffer includes a single input coupled to receive the system ramp signal, wherein the isolation ramp buffer further includes a plurality of isolated outputs, wherein each one of the plurality of isolated outputs is coupled to provide a corresponding one of a plurality of isolated column ramp signals to a corresponding one of the plurality of analog-to-digital converters, wherein each one of the plurality of analog-to-digital converters is coupled to generate a corresponding digital column image signal in response to the corresponding one of the plurality of analog column image signals and the corresponding one of the plurality of isolated column ramp signals; and
a plurality of sense amplifier circuits, wherein each one of the plurality of sense amplifier circuits is coupled between the corresponding one of the plurality of column bitlines and the corresponding one of the plurality of analog-to-digital converters.

9. The imaging system of claim 8 further comprising function logic coupled to the readout circuit to store the image data readout from the plurality of pixel.

10. The imaging system of claim 8, wherein the isolation ramp buffer comprises a plurality of transistors, wherein each one of the plurality of transistors includes a gate terminal coupled to the single input of the isolation ramp buffer to receive the system ramp signal, and wherein each one of the plurality of transistors includes a source terminal coupled to a corresponding one of the plurality of isolated outputs to provide the corresponding one of the plurality of isolated column ramp signals to the corresponding one of the plurality of analog-to-digital converters.

11. The imaging system of claim 10, wherein the isolation ramp buffer further comprises a plurality of current sources, wherein each one of the plurality of current sources is coupled between the source terminal of a corresponding one of the plurality of transistors and ground.

12. The imaging system of claim 8, wherein the system ramp generator comprises:
an operational amplifier having a first input coupled to a reference voltage;
a current source coupled to a second input of the operational amplifier; and
a capacitor coupled between the second input of the operational amplifier and an output of the operational amplifier, wherein the output of the operational amplifier is coupled to provide the system ramp signal to the single input of the isolation ramp buffer.

13. The imaging system of claim 12, wherein the first input of the operational amplifier is a non-inverting input of the operational amplifier, and wherein the second input of the operational amplifier is an inverting input of the operational amplifier.

14. The imaging system of claim 8, wherein each one of the plurality of analog-to-digital converters comprises a comparator having a first input and a second input, wherein the first input is coupled to receive the corresponding one of the plurality of analog column image signals, and wherein the second input is coupled to receive the corresponding one of the plurality of isolated column ramp signals.

15. The imaging system of claim 14, wherein the first input of the comparator is an inverting input of the comparator, and wherein the second input of the comparator is a non-inverting input of the comparator.

* * * * *